United States Patent
Noguchi et al.

(10) Patent No.: US 6,541,132 B2
(45) Date of Patent: Apr. 1, 2003

(54) MAGNETIC DISK HAVING SPECIFIC TRACK WIDTH AND BIT LENGTH

(75) Inventors: Hitoshi Noguchi, Kanagawa (JP); Shinji Saito, Kanagawa (JP); Takeshi Harasawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 96 days.

(21) Appl. No.: 09/892,858

(22) Filed: Jun. 28, 2001

(65) Prior Publication Data

US 2002/0094456 A1 Jul. 18, 2002

(30) Foreign Application Priority Data

Jun. 29, 2000 (JP) .......................... 2000-196405

(51) Int. Cl.$^7$ .............................................. G11B 5/012
(52) U.S. Cl. ..................... 428/694 BA; 428/694 BH; 428/694 SG; 360/135
(58) Field of Search ................. 360/97.01, 86, 360/135; 428/694 B, 694 BN, 694 BA, 694 BH, 694 SG

(56) References Cited

U.S. PATENT DOCUMENTS

| | | | | |
|---|---|---|---|---|
| 4,816,927 A | * | 3/1989 | Rijckaert et al. | 360/10.2 |
| 5,093,822 A | * | 3/1992 | Kugiya et al. | 369/121 |
| 5,218,497 A | * | 6/1993 | Tanabe et al. | 360/113 |
| 5,244,751 A | * | 9/1993 | Takayama et al. | 428/694 |
| 5,496,607 A | | 3/1996 | Inaba et al. | |
| 5,549,955 A | | 8/1996 | Kawamata et al. | |
| 5,786,952 A | * | 7/1998 | Umemoto et al. | 360/48 |
| 5,922,454 A | | 7/1999 | Inaba et al. | |
| 5,976,660 A | | 11/1999 | Saito et al. | |
| 6,251,509 B1 | | 6/2001 | Kawamata et al. | |
| 6,372,325 B1 | * | 4/2002 | Ejiri et al. | 428/141 |
| 6,383,605 B1 | * | 5/2002 | Ejiri | 428/141 |

FOREIGN PATENT DOCUMENTS

| | | |
|---|---|---|
| EP | 0 851 412 A1 | 7/1998 |
| EP | 0 867 865 A1 | 9/1998 |
| EP | 0 869 482 A1 | 10/1998 |
| EP | 0 962 919 A1 | 12/1999 |

OTHER PUBLICATIONS

European Search Report dated Oct. 5, 2001.

* cited by examiner

*Primary Examiner*—H. Thi Le
(74) *Attorney, Agent, or Firm*—Sughrue Mion, PLLC

(57) ABSTRACT

A high-capacity magnetic disk comprises a support, a non-magnetic layer and a magnetic layer having a thickness less than 0.15 $\mu$m and containing ferromagnetic powder selected from fine particles of ferromagnetic metal or fine particles of ferromagnetic hexagonal ferrite dispersed in a binder, and the magnetic disk has a track width less than 5 $\mu$m and can record signals having a bit length less than 0.5 $\mu$m, wherein the ratio of the track width to the average major axis length or tabular diameter of ferromagnetic particles is from 50 to 100, the ratio of the shortest bit length to the average major axis length or tabular diameter of ferromagnetic particles is from 3 to 20, and the thickness of magnetic layer has a variation coefficient of 0.5 or below, expressed in terms of a ratio of the standard deviation to the average thickness of the magnetic layer.

13 Claims, No Drawings

MAGNETIC DISK HAVING SPECIFIC TRACK WIDTH AND BIT LENGTH

FIELD OF THE INVENTION

The present invention relates to a magnetic disk and, more particularly, to a high-density recording magnetic disk having a very thin magnetic layer.

BACKGROUND OF THE INVENTION

As to magnetic disks, it has become standard to install 2MB MF-2HD floppy disks using Co-modified iron oxide in personal computers. Lately, however, there has been a rapid increase in the amount of data to be processed, so it can be said that the capacity of floppy disks of the foregoing type is no longer sufficient. Thus, it is expected to develop large-capacity floppy disks.

In the field of magnetic tapes, as office computers, such as mini-computers, personal computers and work-stations, have come into wide use, lively researches have been done on computer data-recording magnetic tapes (backup tapes) as external storage media. In putting magnetic tapes to practical use for such an application, a step-up in recording capacity is strongly required for achievement of size reduction and high-capacity recording coupled in particular with downsizing of computers and increase of information processing capabilities.

Magnetic recording media hitherto used widely are materials in which a non-magnetic support is coated with a magnetic layer comprising iron oxide, Co-modified iron oxide, $CrO_2$, ferromagnetic metal powder or hexagonal ferrite powder dispersed in a binder. Of such magnetic substances, ferromagnetic metal powder and hexagonal ferrite powder are known to be superior in high-density recording characteristics.

In the case of magnetic disks, 10MB MF-2TD and 21MB MF-2SD are available as large-capacity disks using ferromagnetic metal powder with excellent high-density recording characteristics, and 4MB MF-2ED and 21MB Floptical are available as large-capacity disks using hexagonal ferrite. However, it cannot be said any longer than the capacity and performance of those disks are sufficiently high. Under these circumstances, many attempts have been made to improve high-density recording characteristics.

For instance, JP-A-5-290354 (the term "JP-A" as used herein means an "unexamined published Japanese patent application) discloses the magnetic recording disk having on a non-magnetic layer a magnetic layer controlled so as to have an average thickness of 0.5 $\mu$m or below and a thickness variation within ±15% and thereby ensuring consistent output and overwrite characteristics. However, the magnetic substances used in the examples of the reference are a ferromagnetic powder having a major axis length of 0.2 $\mu$m and a ferromagnetic hexagonal ferrite powder having a particle diameter of 0.06 $\mu$m, and the magnetic layer thickness is adjusted to the relatively thick range of 0.39 to 0.45 $\mu$m. As a result, when the track width and the bit length are reduced in order to attain high-density recording, such a magnetic disk becomes insufficient to meet the desired levels of noise characteristic and half width of isolated waveform (PW50), and cannot attain the needed error rate.

In JP-A-5-298653 is proposed the magnetic recording medium having an average thickness of its magnetic layer in the range of 0.01 to 0.3 $\mu$m and a (standard deviation of thickness)/(average thickness) ratio in the range of 0.05 to 0.5, and thereby achieving high output and small PW50 in digital recording. However, in this reference also, the magnetic substance used in each example is a ferromagnetic metal powder having a major axis length of 0.2 $\mu$m or tabular particles of Co-doped barium ferrite having an average tabular diameter of 0.06 $\mu$m, so such a magnetic recording material also cannot ensure a sufficiently low signal-to-noise ratio in narrow track width-adopted high-density recording.

In addition, JP-A-10-228629 discloses a high-density magnetic recording disk having a surface recording density of 0.2 to 2 Gbit/inch$^2$, wherein the magnetic layer has a thickness of 0.05 to 0.25 $\mu$m, $\phi$m of 10.1 to 1.3 $\mu$Tcm ($8.0 \times 10^{-3}$ to $1.0 \times 10^{-3}$ emu/cm$^2$) and a coercive force of at least 143 kA/m (1,800 oersted) and comprises a ferromagnetic metal fine powder having a major axis length of 0.12 $\mu$m or below or fine particles of ferromagnetic hexagonal ferrite having their sizes in the range of 10 to 100 nm. The magnetic substance used in the examples of the reference is particulate magnetic substance, specifically ferromagnetic metal particles having an average major axis length in the range of 0.048 to 0.20 $\mu$m and a crystallite size of 12 to 22 nm or ferromagnetic hexagonal ferrite particles having an average tabular diameter of 35 nm. As a result, the magnetic recording medium achieves a greatly improved error rate and high performance.

However, as the advance of recording density, it becomes necessary to further reduce the thickness of a magnetic layer. Herein, the relation between a track width and a magnetic particle size and the relation between a bit length and a magnetic particle size are of importance. In the reference cited above, however, the magnetic substance used for the magnetic layers thinner than 0.15 $\mu$m has a rather great major axis length as 0.1 $\mu$m, so that it cannot ensure a sufficiently low signal-to-noise ratio. Moreover, when the thickness of a magnetic layer is decreased to less than 0.15 $\mu$m, the variation coefficient thereof comes to have a noticeable influence. And much noise is produced so far as variations in thickness are not controlled.

SUMMARY OF THE INVENTION

An object of the invention is to provide a large-capacity disk-shaped magnetic recording medium having extensive improvements in electromagnetic characteristics, particularly in high-density recording characteristic, an especially high signal-to-noise ratio and a significantly improved error rate.

In embodiments of the invention, magnetic disks are provided which have the following constitutions respectively, and thereby the aforesaid object is attained.

1. A magnetic disk comprising a support having provided thereon a non-magnetic layer having substantially no magnetism and a magnetic layer having a thickness of less than 0.15 $\mu$m and containing as ferromagnetic powder, fine particles of ferromagnetic metal or ferromagnetic hexagonal ferrite dispersed in a binder, in this order, wherein (I) the disk has a track width of less than 5 $\mu$m and is able to record signals having a bit length of less than 0.5 $\mu$m, (II)-(i) when the ferromagnetic powder is fine particles of ferromagnetic metal, the fine particles of ferromagnetic metal have an average major axis length satisfying conditions that a ratio of the track width to the average major axis length is from 50 to 100 and a ratio of the bit length to the average major axis length is from 3 to 20, (II)-(ii) when the ferromagnetic powder is fine particles of ferromagnetic hexagonal ferrite, the fine particles of ferromagnetic hexagonal ferrite have an average tabular diameter satisfying conditions that a ratio of the track width to the average tabular diameter is from 50 to 100 and a ratio of the bit length to the average tabular diameter is from 3 to 20, and (III) the thickness of the magnetic layer has a variation coefficient less than 0.5, expressed in terms of a ratio of the standard deviation to the average thickness of the magnetic layer.

2. The magnetic disk according to the above embodiment 1, wherein the ferromagnetic powder is fine particles of ferromagnetic hexagonal ferrite having an average tabular diameter of 35 nm or below.

3. The magnetic disk according to the above embodiment 1, wherein the ferromagnetic powder is fine particles of ferromagnetic metal having an average major axis length of 150 nm or below.

4. The magnetic disk according to any one of the above embodiments 1 to 3, wherein the non-magnetic layer and the magnetic layer are those formed by a wet-on-wet coating method.

DETAILED DESCRIPTION OF THE INVENTION

The invention is described in detail below.

The present magnetic disk comprises a support on which are provided a non-magnetic layer having substantially no magnetism and a magnetic layer having a thickness of less than 0.15 µm and containing as ferromagnetic powder, fine particles of ferromagnetic metal or ferromagnetic hexagonal ferrite dispersed in a binder, in this order.

Further, the present magnetic disk has a track width of less than 5 µm, preferably 1 to 4 µm. Furthermore, the present magnetic disk is able to record signals having a bit length of less than 0.5 µm, preferably 0.1 to 0.4 µm.

By adjusting the track width and the bit length to the aforesaid ranges respectively, recording systems enabling extremely high-density recording can be designed. The track width can be adjusted to the foregoing range by making a change in head width, and the bit length can be adjusted to the foregoing range by making a change in maximum track recording density.

When the magnetic layer of the present magnetic disk contains fine particles of ferromagnetic metal as the ferromagnetic powder dispersed in a binder, the fine particles are required to have an average major axis length meeting a condition that the track width-to-average major axis length ratio is from 50 to 100, preferably 60 to 80. Further, the average major axis length of the fine particles is required to meet a condition that the bit length-to-average major axis length ratio is from 3 to 20, preferably 5 to 15.

When the magnetic layer of the present magnetic disk contains fine particles of ferromagnetic hexagonal ferrite as the ferromagnetic powder dispersed in a binder, the fine particles are required to have an average tabular diameter satisfying a condition that the track width-to-average tabular diameter ratio is from 50 to 100, preferably 60 to 80. Further, the average tabular diameter is required to satisfy a condition that the bit length-to-average particle diameter ratio is from 3 to 20, preferably 5 to 15.

As far as ferromagnetic fine particles having their average major axis length or tabular diameter in the ranges satisfying the aforementioned conditions are dispersed in a binder and form a magnetic layer, fluctuations of magnetization in the track edge part can be controlled and the length of magnetization transition between bits can be reduced. As a result, significant improvements in signal-to-noise ratio and error rate can be brought about.

When the track width-to-average major axis length (or average tabular diameter) ratio is smaller than 50, there occur great fluctuations of magnetization in the track edge part, and thereby an increase in noise and a degradation in error rate are caused. And when the ratio is greater than 100, the magnetic particle size is small in relation to the track width, and so agglomeration of magnetic particles occurs and in-plane orientation of magnetic particles is degraded (namely the SQ in the vertical direction increases). Thus, there also occur an increase in noise and degradation in error rate.

On the other hand, when the bit length-to-average major axis length (or average tabular diameter) ratio is small than 3, the length of magnetization transition between bits is great, and thereby a decrease in signal-to-noise ratio and an increase in PW50 are caused. As a result, degradation in error rate is brought about. And when the bit length-to-average major axis length (or average tabular diameter) ratio is greater than 20, the magnetic particle size is small in relation to the bit length, and so agglomeration of magnetic particles occurs and in-plane orientation of magnetic particles is degraded (namely the SQ in the vertical direction increases). Thus, there also occur an increase in noise and degradation in error rate.

The magnetic layer of the present magnetic disk has a thickness of smaller than 0.15 µm, preferably from 0.03 to 0.8 µm. When the thickness is 0.15 µm or above, satisfactory PW50 cannot be attained in high-density recording. As a result, the magnetic disk obtained is inferior in error rate.

Further, the variation coefficient of magnetic layer thickness is 0.5 or below, preferably 0.3 or below, expressed in terms of a ratio of the standard deviation to the average thickness of the magnetic layer (the standard deviation-to-average thickness ratio). When the magnetic layer thickness has its variation coefficient in the foregoing range, DC noise is lowered, and satisfactory error rate can be achieved. On the other hand, when the variation coefficient of magnetic layer thickness is increased beyond 0.5, there occur an increase in noise and degradation in error rate.

As to means of producing a magnetic disk provided with a magnetic layer satisfying the aforesaid variation coefficient range of its thickness, there are no particular restrictions and any appropriate methods can be adopted. It is advantageous to adopt a wet-on-wet coating method, wherein a magnetic layer is coated on a non-magnetic layer while the non-magnetic layer is in a wet state, because such a method enables high-yield production of magnetic disks meeting the aforementioned conditions. However, the invention should not be construed as limiting the production method to the wet-on-wet method, but a wet-on-dry coating method may be employed in the invention as far as the magnetic disks produced can meet the aforementioned relations.

The ingredients for each of layers constituting the present magnetic disk, the layer structure of the present magnetic disk and concrete methods for producing the present magnetic disk are illustrated below. Hereinafter, the magnetic layer is also referred to as an upper layer or an upper magnetic layer, and the non-magnetic layer is also referred to as a lower layer or a lower non-magnetic layer. In addition, all "major axis length" and all "tabular diameter" used for the ferromagnetic particle size in this specification are average values according to conventional usage even where the word "average" is omitted.

[Magnetic Layer]

The magnetic layer of the present magnetic disk has a coercive force (Hc) of preferably at least 143 kA/m (1,800 oersted), more preferably at least 159 kA/m (2,000 oersted), and still more preferably 183 to 279 kA/m (2,300 to 3,500 oersted). When the coercive force is smaller than 143 kA/m (1,800 oersted), it is difficult to achieve high-density recording.

(Ferromagnetic Powder)

The ferromagnetic powder used in the upper magnetic layer is a ferromagnetic metal powder or a hexagonal ferrite powder. As the ferromagnetic metal powder, fine particles having the major axis length of 150 nm or below are preferred, while the hexagonal ferrite powder used is fine tabular particles having the average tabular diameter of 35 nm or below. These magnetic powders are both suitable for high-density recording. The hexagonal ferrite magnetic substance can ensure low noise, so it is suitable for MR head reproduction system.

As the ferromagnetic metal powder, ferromagnetic alloy powders containing α-Fe as the main component are preferred.

Besides containing the specified atom, these ferromagnetic metal powders may contain one or more atoms, for example, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr and B atoms. In particular, it is preferred to use a ferromagnetic metal powder containing, in addition to α-Fe, at least one atom selected from the group consisting of Al, Si, Ca, Y, Ba, La, Nd, Sm, Co, Ni and B, and more preferably at least one atom selected from the group consisting of Co, Y, Al, Nd and Sm.

The content of Co is preferably from 0 to 40 atomic %, more preferably from 15 to 35 atomic %, and still more preferably from 20 to 35 atomic %, based on the Fe.

The content of Y is preferably from 1.5 to 12 atomic %, more preferably from 3 to 10 atomic %, and still more preferably from 4 to 9 atomic %, based on the Fe.

The content of Al is preferably from 1.5 to 30 atomic %, more preferably from 5 to 20 atomic %, and still more preferably from 8 to 15 atomic %, based on the Fe.

Prior to dispersion, the ferromagnetic metal powders may be treated with a dispersing agent, a lubricant, a surfactant and/or an antistatic agent as described below. These treatments are specifically described, for example, in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026,215, 3,031,341, 3,100,194, 3,242,005 and 3,389,014.

The ferromagnetic metal powders may further contain a slight amount of hydroxides or oxides.

The ferromagnetic metal powders used in the invention are those obtained by known manufacturing methods. The following are manufacturing methods which the invention can adopt:

1) a method of reducing a composite organic acid salt (mainly an oxalate) with a reducing gas such as hydrogen,
2) a method of reducing iron oxide with a reducing gas such as hydrogen to produce particulate Fe or Fe—Co,
3) a method of thermally decomposing a metal carbonyl compound,
4) a method of adding a reducing agent, such as sodium borohydride, a hypophosphite or hydrazine to an aqueous solution of ferromagnetic metal ion to reduce the ion, and
5) a method of evaporating a metal in an inert gas atmosphere of low pressure, thereby pulverizing the metal.

The ferromagnetic metal particles produced by the methods as described above may be subjected to any of slow oxidation treatments, including a method of drying the particles after immersion in an organic solvent, a method of immersing the particles in an organic solvent and thereinto blowing an oxygen-containing gas to form an oxide film on the particle surface and then drying the particles, and a method of forming an oxide film on the particle surface by controlling pressure shares of oxygen gas and inert gas without using any organic solvent.

Examples of ferromagnetic hexagonal ferrite usable in the invention include barium ferrite, strontium ferrite, lead ferrite, calcium ferrite, and these types of ferrite having undergone substitution with various elements, such as cobalt. More specifically, magnetoplumbite type barium and strontium ferrites, magnetoplumbite type ferrite having particle surface coated with spinel, and composite magnetoplumbite type barium and strontium ferrites having in part a spinal phase can be used in the invention. In addition to the specified atoms, the above-recited ferrite may contain one or more other atoms such as Al, Si, S, Nb, Sn, Ti, V, Cr, Cu, Y, Mo, Rh, Pd, Ag, Sm, Sb, Te, W, Re, Au, Bi, La, Ce, Pr, Nd, P, Co, Mn, Zn, Ni, B, Ge and Nb atoms.

Examples of a combination of elements which can be added to the ferrite as recited above include Co-Zn, Co-Ti, Co-Ti-Zr, Co-Ti-Zn, Ni-Ti-Zn, Nb-Zn-Co, Sn-Zn-Co, Sn-Co-Ti and Nb-Zn combinations. In addition, the ferrite as recited above may be contaminated with impurities resulting from the raw materials and manufacturing method used.

As to the powder size, an average tabular diameter of hexagonal tabular particles is preferably from 10 to 35 nm, more preferably from 20 to 30 nm.

As to the specific surface area (SBET) measured by BET method, the ferromagnetic powder contained in the present magnetic layer ordinarily has its SBET value in the range of 45 to 80 $m^2/g$, preferably in the range of 50 to 70 $m^2/g$. It is undesirable for the ferromagnetic powder to have its SBET value outside the foregoing range, because SBET values smaller than 45 $m^2/g$ cause noise increase and those greater than 80 $m^2/g$ make it difficult to attain satisfactory surface properties.

The crystallite size of the ferromagnetic metal powder used is ordinarily from 8 to 18 nm, preferably from 10 to 18 nm, and more preferably from 11 to 17.5 nm.

The average major axis length of the ferromagnetic metal powder used is preferably from 30 to 150 nm, more preferably from 30 to 100 nm.

The suitable acicular ratio of the ferromagnetic metal powder used is preferably from 3 to 15, more preferably from 5 to 12.

The saturation magnetization (σs) of the ferromagnetic powder used in the invention is ordinarily from 100 to 200 $A·m^2/kg$ (100 to 200 emu/g), preferably from 120 to 180 $A·m^2/kg$ (120 to 180 emu/g).

The hexagonal ferrite used in the invention ordinarily has the tabular ratio of 2 to 20, preferably 2 to 5, and its saturation magnetization (σs) is ordinarily 30 to 70 $A·m^2/kg$ (emu/g), preferably 40 to 60 $A·m^2/kg$ (emu/g).

It is preferred that the ferromagnetic powder has a water content of 0.01 to 2.0% by weight. The water content in the ferromagnetic metal powder is preferably optimized depending on the kind of the binder used together. Further, it is preferred that the pH of the ferromagnetic powder is optimized depending on the combination with the binder used. The optimal pH range is ordinarily from 4 to 12, preferably from 6 to 10.

The ferromagnetic powder may be subjected to surface treatment with Al, Si, P or an oxide of such an element, if desired. The proportion of such an element or its oxide to the ferromagnetic powder used for the surface treatment is ordinarily from 0.1 to 10 weight %. This surface treatment can produce a desirable effect that adsorption of a lubricant such as fatty acid can be controlled to 100 mg/m$^2$ or below.

The ferromagnetic powder used contains an inorganic ion such as Na, Ca, Fe, Ni or Sr ion in some cases. Although it is preferable that the ferromagnetic powder is substantially free of such ions, they have little effect on characteristics of the magnetic layer so far as their content is 200 ppm or below.

Further, it is more preferred that the ferromagnetic powder used has fewer pores. The suitable proportion of pores is preferably 20 volume % or below, more preferably 5 volume % or below.

In addition, the ferromagnetic metal powder used in the invention may have any of acicular, rice-grain and spindle shapes as far as it meets the foregoing particle size requirements.

It is preferred that the ferromagnetic powder itself has small SFD (switching field distribution). The value of SFD is preferably 0.8 or below. In other words, it is preferable that the Hc distribution of ferromagnetic powder is narrow. The SFD values below 0.8 are suitable for high-density digital magnetic recording, because they can ensure satisfactory electromagnetic characteristics, high output, sharp magnetization reversal and reduced peak shift. In the case of ferromagnetic metal powders, such a narrow Hc distribution can be attained by rendering the particle size distribution of geothite narrow or preventing geothite from sintering.

(Abrasives)

In the magnetic layer of the present magnetic disk, known abrasives can be used. In particular, diamond and alumina particles are preferably used.

<Diamond and Alumina Particles>

In the case of diamond, artificial diamond is generally used, because natural diamond is expensive. Examples of a production method of diamond include the so-called static synthesis method, wherein diamond is produced from graphite through Fe, Co or Ni under high temperature and high pressure or it is produced by causing reaction of graphite or furan resin carbons under high temperature and high pressure, dynamic synthesis methods and vapor-phase synthesis methods. Any of those methods may be adopted for the production of diamond for use in the invention.

The average size of diamond particles is preferably from 0.05 to 1 μm, more preferably from 0.07 to 0.5 μm. The suitable proportion of diamond mixed in the magnetic layer is from 0.1 to 5 weight %, preferably from 0.5 to 3 weight %, to the ferromagnetic powder.

The diamond which has been used industrially for cutting or abrasive purpose and undergone removal of impurities by discrimination washing may be utilized secondarily. Classification of diamond particles can be effected by applying centrifugal force to a diamond dispersion or utilizing a special mesh filter.

As the alumina particles, aluminum oxide having an α-alumina content of at least 90% and β-alumina can be employed. The suitable average size of alumina particles is from 0.01 to 1.0 μm, preferably from 0.05 to 0.5 μm. The proportion of alumina particles mixed in the magnetic layer is preferably from 0.1 to 20 weight %, more preferably from 0.5 to 3 weight %, to the ferromagnetic powder.

<Other Abrasives>

In the magnetic layer of the present magnetic disk, abrasives other than those described above may be used together therewith, if desired. As such abrasives, known materials having Mohs hardness of at least 6, such as silicon carbide, chromium oxide, cerium oxide, α-iron oxide, corundum, silicon nitride, titanium carbide, titanium oxide, silicon dioxide and boron nitride, can be used alone or as combinations. Further, these abrasives may be used in the form of complex (obtained by treating the surface of one abrasive with another abrasive). Although those abrasives sometimes contain compounds or elements other than their main components, they can function as abrasives as far as the proportion of their respective main components is greater than 90 weight %. The average particle size of those abrasives used together is ordinarily from about 0.01 to 2 μm. In order to enhance electromagnetic characteristics in particular, it is advantageous that those abrasives have narrow particle size distributions. For elevation of durability, on the other hand, abrasives having different particle sizes can be used in combination as required, or abrasives can be used individually as far as their particle size distributions are broad.

It is advantageous that the abrasives used in the magnetic layer, inclusive of diamond and alumina particles, have their tap density in the range of 0.3 to 2 g/cc, their water content in the range of 0.1 to 5 weight %, their pH in the range of 2 to 11 and their specific surface area in the range of 1 to 30 m$^2$/g.

The abrasives may have any of acicular, spherical and cubic shapes. However, shapes sharpened in parts are advantageous from the viewpoint of abrasive capability.

Examples of available abrasives include AKP-12, AKP-15, AKP-20, AKP-30, AKP-50, HIT-20, HIT-30, HIT-55, HIT-60, HIT-70, HIT-80 and HIT-100, which are products of Sumitomo Chemical Co., Ltd.; ERC-DBM, HP-DBM and HPS-DBM, which are products of Reynolds Metals Company; WA10000, a product of Fujimi Corporation; UB20, a product of C. Uemura & Co., Ltd.; G-5, Chromex U2 and Chromex U1, products of Nippon Chemical Industrial Co., Ltd.; TF100 and TF140, products of Toda Kogyo Corp.; Beta Random Ultrafine, a product of Ibiden Co., Ltd.; and B-3, a product of Showa Mining Co., Ltd.

These abrasives can be also added to the lower layer, if desired. By adding abrasives to the lower layer, the surface profiling can be controlled, or protuberances of abrasives from the surface can be controlled. Needless to say, optimum values are selected for the sizes and the amounts of abrasive particles used in the magnetic layer and added to the lower layer.

(Carbon Black mixed in Magnetic Layer)

Ingredients mixed in the magnetic layer may include carbon black besides the abrasives as recited above. Examples of carbon black suitable as such an ingredient include furnace black for rubber use, thermal black for rubber use, carbon black for color and acetylene black.

It is preferred that the carbon black used in the present magnetic layer have its specific surface area in the range of 5 to 500 m$^2$/g, its DBP absorptive capacity in the range of 10 to 400 ml/100 g, its average particle size in the range of 5 to 300 nm, its pH in the range of 2 to 10, its water content in the range of 0.1 to 10 weight % and its tap density in the range of 0.1 to 1 g/cc.

Examples of available carbon black include BLACKPEARLS-130 produced by CabotCorp., #55, #50, and #35 produced by Asahi Carbon Co., Ltd., N660 produced by Mitsubishi Chemical Corp., and RAVEN 410, 420, 500 and 22 produced by Columbian Chemicals Co.

In advance of its use, carbon black may be surface-treated with a dispersing agent, a resin may be grafted on carbon black, or carbon black surface may be partly converted into graphite. On the other hand, carbon black may be dispersed in a binder before it is added to a magnetic coating composition. The carbon black may be used individually or in combination of two or more thereof.

When carbon black is mixed in the magnetic layer, the preferred proportion of carbon black to a ferromagnetic powder is from 0.1 to 30 weight %. The carbon black mixed in the magnetic layer has functions of preventing electrostatic charge, reducing a friction coefficient, light shielding and increasing the film strength. The kind of function of the carbon black may be varied depending on the nature of the carbon black used. Therefore, the kinds, amounts and combination of carbon black products may be different between the upper magnetic layer and the lower layer. Of course, it is possible to choose different carbon black products for the magnetic layer and the lower layer on the basis of the foregoing properties, such as the particle size, oil absorption, conductivity and pH, so to suite respective purposes of these layers. But actually, it is required in each layer to optimize the conditions under which carbon black is used. Details of various types of carbon black usable in the present magnetic layer can refer to, e.g., *Carbon Black Binran* (*which may be translated by the English title "Handbook of Carbon Black"*), compiled by Carbon Black Association.

[Non-magnetic Layer (Lower Layer)]

Now, the lower layer is described in detail below.

The lower layer of the present magnetic disk has no particular restrictions on its composition so far as the layer exhibits no magnetism in a substantial sense. In general, however, the layer comprises at least a binder. And it is preferable to disperse powder, e.g., an inorganic or organic powder, into the binder.

Such an inorganic powder is generally non-magnetic, but it may also be magnetic so far as it is used to an extent that the lower layer is kept non-magnetic in a substantial sense. The expression "the lower layer is non-magnetic in a substantial sense" means that the lower layer is allowed to have magnetism to an extent of causing substantially no deterioration in electromagnetic characteristics of the upper layer. Specifically, such an extent of magnetism is comparable to the case where the lower layer has residual magnetic flux density 0.01 tesla (100 gauss) or below and coercive force of 7.96 kA/m (100 oerstead) or below.

(Non-magnetic Powder)

The non-magnetic powder can be selected from inorganic compounds, such as metal oxides, metal carbonates, metal sulfates, metal nitrides, metal carbides or metal sulfides. More specifically, aluminum oxide having an α-alumina content of 90 or more, β-alumina, γ-alumina, θ-alumina, silicon carbide, chromium oxide, cerium oxide, α-iron oxide, hematite, goethite, corundum silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide can be used alone or as combinations of two or more thereof. Of these inorganic compounds, titanium oxide, zinc oxide, iron oxide and barium sulfate are used to advantage because these compounds have narrow particles size distributions and many means to impart functions. In particular, it is effective to use titanium oxide and α-iron oxide.

It is preferred that those non-magnetic powders have an average particle size of 0.005 to 2 μm. However, if desired, the average particle size may fall within such a range by the combined use of non-magnetic powders differing in particle size or independent use of a non-magnetic powder having a broad particle size distribution. In particular, non-magnetic powders having their average particle sizes in the range of 0.01 to 0.2 μm are preferable. When the non-magnetic powder is granular metal oxide, the preferable average diameter thereof is 0.08 μm or below; while, in the case of acicular metal oxide, the preferable average major axis length is 0.3 μm or below, more preferably 0.2 μm or below. The tap density of non-magnetic powder is ordinarily from 0.05 to 2 g/ml, preferably from 0.2 to 1.5 g/ml. The water content of non-magnetic powder is ordinarily in the range of 0.1 to 5 weight %, preferably 0.2 to 3 weight %, more preferably 0.3 to 1.5 weight %. The pH of non-magnetic powder is ordinarily in the range of 2 to 11, but the pH range of 3 to 10 is particularly preferred.

The specific surface area of non-magnetic powder is ordinarily in the range of 1 to 100 m$^2$/g, preferably 5 to 80 m$^2$/g. And the particularly preferred specific surface area is from 10 to 70 m$^2$/g. The e crystallite size of non-magnetic powder is preferably from 0.004 to 1 μm, more preferably 0.04 to 0.1 μm. The oil absorptive capacity using dibutyl phthalate (DBP) is ordinarily in the range of 5 to 100 ml/100 g, preferably 10 to 80 ml/100 g, more preferably 20 to 60 ml/100 g. The specific gravity is ordinarily from 1 to 12, preferably from 3 to 6. The shape of non-magnetic powder may be any of acicular, spherical, polyhedral and tabular shapes. The Mohs hardness of non-magnetic powder is preferably from 4 to 10. The amount of stearic acid (SA) adsorbed to non-magnetic powder is ordinarily in the range of 1 to 20 μmol/m$^2$, preferably 2 to 15 μmol/m$^2$, more preferably 3 to 8 μmol/m$^2$.

It is preferred that the non-magnetic powders as recited above undergo surface treatment for forming $Al_2O_3$, $SiO_2$, $TiO_2$, $ZrO_2$, $SnO_2$, $Sb_2O_3$, ZnO or $Y_2O_3$ on the powder surface. Of these oxides, $Al_2O_3$, $SiO_2$, $TiO_2$ and $ZrO_2$, especially $Al_2O_3$, $SiO_2$ and $ZrO_2$, are preferred from the viewpoint of dispersibility. Those oxides may be used in combination or independently. Such a surface treatment layer may be formed by co-precipitation of the desired oxides, or by providing an alumina layer first and then silica layer, or vise versa. In addition, the surface treatment layer formed may be porous depending on the intended purpose, but it is ordinarily preferred that the layer be uniform and dense.

Examples of non-magnetic powder usable for the present lower layer include Nanotite produced by Showa Denko K. K., HIT-100 and ZA-G1 produced by Sumitomo Chemical Co., Ltd., α-hematite DPN-250, DPN-250BX, DPN-245, DPN-270BX, DPN-500BX, DBN-SA1 and DBN-SA3 produced by Toda Kogyo Corp., titanium oxide TTO-51B, TTO-55A, TTO-55B, TTO-55C, TTO-55S, TTO-55D and SN-100, α-hematite E270, E271, E300 and E303 produced by Ishihara Sangyo Co., Ltd., titanium oxide STT-4D, STT-30D, STT-30 and STT-65C, α-hematite α-40 produced by Titan Kogyo K. K., MT-100S, MT-100T, MT-150W, MT-500B, MT-600B, MT-100F and MT-500HD produced by Tayca Corp., FINEX-25, BF-1, BF-10, BF-20 and ST-M produced by Sakai Chemical Industry Co., Ltd., DEFIC-Y and DEFIC-R produced by Dowa Mining Co., Ltd., AS2BM and TiO2P25 produced by Nippon Aerosil Co., Ltd., 100A and 500A produced by Ube Industries Ltd., and burned substances thereof. Of these non-magnetic powder, titanium dioxide and α-iron oxide products are preferred in particular.

(Carbon Black mixed in Lower Layer)

By mixing carbon black in a lower layer, known effects can be imparted to the layer. For instance, the surface electric resistance (Rs) can be lowered, the light transmittance can be reduced, and the desired micro Vickers hardness can be attained. In addition, the carbon black contained in the lower layer can produce a lubricant storage effect. As to the kinds of carbon black capable of producing such effects, furnace black for rubber use, thermal black for rubber use, carbon black for color and acetylene black are usable. It is appropriate that the carbon black used for the lower layer be optimized as to the characteristics as mentioned below depending on the desired effects. In some cases, greater effects can be achieved by combined use of different kinds of carbon black.

The carbon black used in the lower layer ordinarily has its specific surface are in the range of 100 to 500 $m^2/g$, preferably 150 to 400 $m^2/g$, and its DBP absorptive capacity ordinarily in the range of 20 to 400 ml/100 g, preferably 30 to 400 ml/100 g. The average particle size of the carbon black used in ordinarily from 5 to 80 nm, preferably from 10 to 50 nm, more preferably from 10 to 40 nm. Further, it is preferred that the pH, water content and tap density of the carbon black used be from 2 to 10, from 0.1 to 10 weight % and from 0.1 to 1 g/ml, respectively.

Examples of carbon black usable in the lower layer include BLACKPEARLS 2000, 1300, 1000, 900, 800, 880 and 700, and VULCAN XC-72 produced by Cabot Corp., #3050B, #3150B, #3250B, #3750B, #3950B, #950, #650, #970B, #850B, MA-600, MA-230, #4000 and #4010 produced by Mitsubishi Chemical Corp., CONDUCTEX SC, RAVEN, 8800, 8000, 7000, 5750, 5250, 3500, 2100, 2000, 1800, 1500, 1255 and 1250 produced by Columbian Chemicals Co., and Ketjenblack EC produced by Akzo Co., Ltd.

In advance of its use, carbon black may be surface-treated with a dispersing agent, a resin may be grafted on carbon black, or carbon black surface may be partly converted into graphite. On the other hand, carbon black may be dispersed in a binder before it is added, to a coating composition.

The carbon black can be used in a proportion lower than 50 weight to the inorganic compound powder as recited above, and that lower than 40 weight % to the total weight of non-magnetic layer. The carbon black of various kinds as recited above may be used alone or as combinations. Details of various kinds of carbon black usable in the present invention can refer to, e.g., *Carbon Black Binran* (*which may be translated by the English title "Handbook of Carbon Black"*), compiled by Carbon Black Association.

To the lower layer, organic powders can also be added depending on the intended purposes. Examples of an organic powder which can be added include acrylic-styrene resin powder, benzoguanamine resin powder, melamine resin powder and phthalocyanine pigments. Further, polyolefin resin powder, olyester resin powder, polyamide resin powder, polyimide resin powder and polyfluoroethylene resin powder may be used. For production of those organic powders, the methods described in JP-A-62-18564 and JP-A-60-255827 can be adopted.

[Binders]

What kinds and amounts of binders are appropriate for the magnetic and the lower layers to constitute the present magnetic disk can be determined referring to hitherto known arts.

The binders used in the invention may be any of resins hitherto used as binders, including known thermoplastic resins, thermosetting resins, reactive resins and mixtures thereof.

As to the thermoplastic resins usable as binders, their glass transition temperature is ordinarily within the range of −100 to 150° C., their number average molecular weight is ordinarily within the range of 1,000 to 200,000, preferably 10,000 to 100,000, and their polymerization degree is ordinarily of the other of 50–1,000.

Examples of such thermoplastic resins include homopolymers and copolymers containing constituent units derived from monomers such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether, polyurethane resin and various resins of rubber type.

And examples of thermosetting resins or reactive resins include phenol resin, epoxy resin, cure type polyurethane resin, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate.

Details of these resins are described, e.g., in *Plastics Handbook*, published by Asakura Shoten.

On the other hand, it is possible to use known electron beam-curable resins in each layer. Detailed explanation of such resins and manufacturing methods thereof can be found in JP-A-62-256219.

The resins as recited above can be used alone or as a combination of two or more thereof. As suitable examples of a resin combination, mention may be made of a combination of polyurethane resin and at least one resin selected from the groups consisting of vinyl chloride resin, vinyl chloride-vinyl acetate copolymer, vinyl chloride-vinyl acetate-vinyl alcohol copolymer and vinyl chloride-vinyl acetate-maleic anhydride copolymer, and a combination of the foregoing combination and polyisocyanate.

As the polyurethane resin, those known including polyesterpolyurethane, polyetherpolyurethane, polyetherpolyesterpolyurethane, polycarbonatepolyurethane, polyesterpolycarbonatepolyurethane and polycaprolactone-polyurethane can be adopted.

For enhancing dispersibility and durability of all the binders recited above, it is preferred that at least one polar group selected from —COOM, —$SO_3$M, —$OSO_3$M, -P=O $(OM)_2$, -O-P=O$(OM)_2$ (wherein M is a hydrogen atom or an alkali metal base), —OH, —$NR_2$, —$N^+R_3$ (wherein R is a hydrocarbon group), epoxy group, —SH or —CN is introduced into each binder by copolymerization or addition reaction.

The suitable content of such polar groups in each binder is from $10^{-1}$ to $10^{-8}$ mole/g, preferably from $10^{-2}$ to $10^{-4}$ mole/g.

Examples of those binders usable in the invention include VAGH, VYHH, VMCH, VAGF, VAGD, VROH, VYES, VYNC, VMCC, XYHL, XYSC, PKHH, PKHJ, PKHC AND PKEE produced by Union Carbide Co., MPR-TA, MPR-TA5, MPR-TAL, MPR-TSN, MPR-TMF, MPR-TS, MPR-TM and MPR-TAO produced by Nissan Chemical Industry Co., Ltd., 1000W, DX80, DX81, DX82, DX83 and 100FD produced by Denki Kagaku Kogyo K.K., MR-104, MR-105, MR110, MR100, MR555 and 400X-110A produced by Nippon Zeon Co., Ltd., Nippon N2301, N2302 and N2304 produced by Nippon Polyurethane Industry Co., Ltd., Pandex T-5105, T-R3080 and T-5201, Barnoc D-400 and D210-80, and Crysbon 6109 and 7209 produced by Dainippon Ink & Chemicals, Inc., Vylon UR8200, UR830, UR-8700, RV530 and RV280 produced by Toyobo Co., Ltd., Daiferamine 4020, 5020, 5100, 5300, 9020, 9022 and 7020 produced by Dainichiseika C. & C. Mfg. Co., Ltd., MX5004 produced by Misubishi Chemical Industries Ltd., Sanprene SP-150 produced by Sanyo Chemical Corp., and Saran F310 and F210 produced by Asahi Chemical Industry Co., Ltd.

In the present magnetic disk, such a binder is used in a proportion of ordinarily 5 to 50 weight %, preferably 10 to 30 weight %, to the non-magnetic powder in the lower layer or the ferromagnetic powder in the magnetic layer.

More specifically, it is favorable to use as the binder vinyl chloride resin in a proportion of 5 to 30 weight %, polyurethane resin in a proportion of 2 to 20 weight % and polyiscoyanate in proportion of 2 to 20 weight % in combination. However, it is possible to use polyurethane alone or a combination of polyurethane with polyisocyanate alone in the case where a slight amount of chlorine evolved dechlorination causes head corrosion.

In the case of using polyurethane as a binder in the invention, it is preferred that the polyurethane have a glass transition temperature of −50 to 150° C., preferably 0 to 100° C., endure an elongation of 100 to 2,000% and a stress of 0.45 to 98 N/mm² (0.05 to 10 Kg/mm²) before it breaks, and have a yield point of 0.49 to 98 N/mm² (0.05 to 10 Kg/mm²).

The magnetic disk is basically constructed of a lower layer and a magnetic layer, but the lower layer and/or the magnetic layer may have two or more constituent layers. Therefore, needless to say, it is possible to vary the binder content, the proportion of vinyl chloride resin, polyurethane resin, polyisocyanate and other resins in the binder, or the molecular weight, polar group content and physical characteristics of each constituent resin of the binder from one constituent layer to another, if desired. If anything, it is better to optimize those factors on a constituent layer basis. In this case, known arts of multilayer structure are applicable. In the case of varying the binder content from one constituent layer to another, for instance, an increase in binder content in a magnetic layer enables reduction of abrasion at the magnetic layer surface.Also, to increase the content of binder resin in a lower layer can render the lower layer flexible and improve the touch of a head on the magnetic disk. In applying known arts, it goes without saying that optimizations are performed within a range that the present effects can be achieved.

Examples of polyisocyanate usable in the invention include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates. Commercially available products of the isocyanates as recited above are, e.g., Colonate L, Colonate HL, Colonate 2030, colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), and Desmodur L, Desmodure IL, Desmodure N and Desmodure HL (trade names, produced by Sumitomo Bayer Co., Ltd.). In each layer, these products may be used alone or as a combination of at least two products utilizing a difference in curing reactivity.

[Additives]

Compounds having a lubricating effect, an antistatic effect, a dipersing effect or a plasticizing effect can be used as additives for the magnetic layer and the lower layer to constitute the present magnetic disk. Examples of compounds usable as such additives include molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkylphosphoric acid ester and alkali metal salts thereof, alkylsulfuric acid ester and alkali metal salts thereof, polyphenyl ether, phenylphosphonic acid, α-natphthylphosphoric acid, phenylphosphoric acid, diphenylphosphoric acid, p-ehtylbenzenephosphonic acid, phenylphosphinic acid, aminoquinone, various silane coupling agents, titanium coupling agent, fluorine-containing alkylsulfuric acid ester and alkali metal salts thereof, monobasic fatty acid containing 10 to 24 carbon atoms (which may contain unsaturated bonds or may be branched) and metal salts of such a fatty acid (e.g. Li, Na, Ka and Cu salts), monohydric to hexahydric alcohols each containing 10 to 22 carbon atoms (which may have unsaturated bonds or branched chains), alkoxyalcohol containing 12 to 22 carbon atoms (which may have unsaturated bonds or may be branched), mono-, di- or trifatty acid ester produced by reaction of 10–24C monobasic fatty acid (which may have unsaturated bonds or may be branched) with one kind of alcohol chosen from 2–22C monohydric to hexahydric alcohols (which may have unsaturated bonds or may be branched), ester or fatty acid and polyalkylene oxide monoalkyl ether, fatty acid amide containing 8 to 22 carbon atoms, and aliphatic amine containing 8 to 22 carbon atoms.

More specifically, the foregoing fatty acid includes capric acid, caprylic acid, lauric acid, myristic acid, palmitic acid, stearic acid, behenic acid, oleic acid, elaidic acid, linoleic acid, linolenic acid, and isostearic acid.

The foregoing ester includes butyl stearate, octyl stearate, amyl stearate, isooctyl stearate, butyl myristate, octylmyristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl ester.

The foregoing alcohol includes oleyl alcohol, stearyl alcohol, and lauryl alcohol.

Further, nonionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acid groups such as carboxyl, sulfo, phospho, sulfate and phosphate groups, and amphoteric surfactants, such as amino acids, aminosulfonic acids, sulfuric or phosphoric acid esters of aminoalcohols, and alkyl betaine-type surfactancts, can be used. Details of these surfactants are described in Kaimen Kasseizai Binran (which may be translated by the English title "Handbook of Surfactants"), published by Sangyo Tosho K. K. The lubricants and antistatic agents as recited above are not always required to be pure, but may contain impurities, such as isomers, unreacted materials, by-products, decomposed matter and oxides. The allowable level of contamination with such impurities is below 30 weight %, preferably below 10 weight %.

Those lubricants and surfactants usable in the invention have different physical actions from each other. So it is required to determine their species and amounts, and the proportion between lubricants capable of producing a synergistic effect optimally depending on the intended purpose. For instance, it is thought that their oozing from the layer surface can be controlled by using fatty acids having different melting points or esters having different boiling points, melting points and polarities in the lower layer and the magnetic layer respectively, the coating stability is enhanced by controlling the amount of surfactants added, and the lubricating effect is elevated by adding a greater amount of lubricant to the lower layer. Needless to say, the cases mentioned above should not be construed as limiting the scope of the invention. In general the total proportion of lubricants can be chosen from the range of 0.1 to 50 weight %, preferably 2 to 25 weight %, to the ferromagnetic powder in the magnetic layer or the non-magnetic powder in the lower layer.

All or part of additives used in the invention may be added in any of processes for preparing the magnetic or non-magnetic coating composition. For instance, there may be cases where the additives are mixed with a ferromagnetic powder prior to the kneading process, they are added during the process of kneading a ferromagnetic powder, a binder and a solvent, they are added in the process of dispersion, they are added after the dispersion process, and they are added just before coating. On the other hand, simultaneous or successive application of all or part of the additives to an already formed magnetic layer sometimes allows the desired purposes to be achieved. Further, in some cases, the magnetic layer surface may be coated with a lubricant after calendering (heating and pressing treatment with a calender roll) or slitting operation.

For preparing the coating compositions as mentioned above, known organic solvents are usable, with examples including the solvents described in JP-A-6-68453.

[Layer Structure]

The layer structure of the present magnetic disk is described below in detail.

A thickness of the support of the present magnetic disk is preferably from 2 to 100 $\mu$m, more preferably from 2 to 80 $\mu$m.

Between the support and the lower layer, a stubbing layer may be provided for the purpose of adhesion enhancement. A thickness of the stubbing layer is preferably from 0.01 to 0.5 $\mu$m, more preferably from 0.02 to 0.5 $\mu$m.

The present magnetic disk may be a double-sided disk-shaped magnetic medium provided with a lower layer and the magnetic layer on each side of the support, or a single-sided disk-shaped magnetic medium provided with those layers on only one side of the support. In the latter case, a backing layer may be provided on the side opposite to the lower and magnetic layers for producing effects of preventing electrification and compensating for curl. A thickness of the backing layer is preferably from 0.1 to 4 $\mu$m, more preferably from 0.3 to 2.0 $\mu$m. To these subbing and backing layers, known ones are applicable.

The magnetic layer thickness of the magnetic disk is optimized depending on the saturation magnetization of a head used, the head gap length and the frequency band of recording signals. In the invention, the magnetic layer thickness is below 0.15 $\mu$m, preferably from 0.03 to 0.10 $\mu$m. The present magnetic layer may be divided into two or more layers differing in magnetic characteristics, and can be made up according to known constitutions for magnetic layers having a multilayer structure.

A thickness of the lower layer is ordinarily from 0.2 to 5 $\mu$m, preferably from 0.3 to 3 $\mu$m, more preferably from 1 to 2.5 $\mu$m. The lower layer can achieve its effect as far as it is substantially non-magnetic. Even when the lower layer contains magnetic impurities or a slight amount of magnetic substance is added thereto intentionally, the effects intended by the invention can be produced. Therefore, as already described, such a layer is regarded as having substantially the same composition as the present lower layer. Specifically, there is a case where an under layer having residual magnetic flux density of 0.01 tesla (100 gauss) or below or coercive force of 7.96 kA/m (100 oerstead) or below. However, a layer having neither residual magnetic flux density nor coercive force is preferred.

[Support]

As a non-magnetic support used for the present magnetic disk, a resin film is preferred. Examples of such a resin film include known films made from polyesters, such as polyethylene terephthalate and polyehtylene naphthalate, polyolefins, cellulose triacetate, polycarbonate, polyamides (including aliphatic polyamides and aromatic polyamides such as aramide), polyimide, polyamideimide, polysulfone and polybenzoxazole. Of these films, films having high strength, such as polyethylene naphthalate and polyamide films, are preferred as the support. If desired, the multilayer support as disclosed in JP-A-3-224127 can be used for varying the roughness of the support surface on the magnetic layer side. These support materials may undergo in advance corona discharge treatment, plasma treatment, adhesion-increasing treatment, heat treatment and dust cleaning treatment.

An F-5 value of the support is preferably from 49 to 490 N/mm$^2$ (5 to 50 Kg/mm$^2$). A thermal shrinkage ratio of the support is preferably 3% or below, more preferably 1.5% or below, under heating at 100° C. for 30 minutes, while that is preferably 0.5% or below, more preferably 0.1% or below, under heating at 80° C. for 30 minutes. Further, it is preferred that the support endure a stress of 49 to 980 N/mm$^2$ (5 to 100 Kg/mm$^2$) before it breaks and have a elasticity coefficient of 980 to 19600 N/mm$^2$ (100 to 2000 Kg/mm$^2$). In addition, the temperature expansion coefficient thereof is from $10^{-4}$ to $10^{-8}$/° C., preferably from $10^{-5}$ to $10^{-6}$/° C., and the humidity expansion coefficient thereof is $10^{-4}$/RH % or below, preferably $10^{-5}$/RH %. Moreover, it is advantageous that these thermal characteristics, dimensional characteristics and mechanical strength characteristics be almost uniform in all in-plane directions with tolerances of 10%.

[Method of Producing Magnetic Disk]

The method of producing the present magnetic disk comprises a process of preparing coating compositions for constituent layers, a process of coating the coating compositions on a support, and a process of subjecting the coating layers to orientation, drying, cooling, calendering, stamping, after-curing, polish and assemblage treatments in succession.

The process of preparing a coating composition for the magnetic layer or the lower layer comprises at least kneading and dispensing steps and, if desired, mixing steps may be added before and after those steps. Each step may be parted into two or more stages.

All materials, inclusive of a ferromagnetic powder, a non-magnetic powder, a binder, carbon black, an abrasive, an antistatic agent, a lubricant and a solvent, may be added at the beginning or during the course of any of steps. Each material may be added in two or more portions at separate steps. For instance, it is allowable to charge polyurethane binder divided into three portions at a kneading step, a dispensing step and a mixing step for viscosity adjustment after dispersion, respectively.

In addition, hitherto known techniques for production may be applied to some steps. At the kneading step, it is advantageous to use might kneading machines, such as an open kneader, a continuous kneader, a pressurized kneader and an extruder. When such a kneader is used, a binder (at least 30 weight % of the total binder) in an amount of 15 to 500 parts by weight is kneaded with 100 parts by weight of magnetic or non-magnetic powder. The details of kneading treatment are described in JP-A-1-106338 and JP-A-1-79274.

In order to disperse coating compositions for the magnetic layer and the lower layer, it is possible to use glass beads, but zirconia beads, titania beads and steel beads as dispersion media greater in specific gravity are used preferably. A particle size and a charging rate of the dispersion medium are optimally selected. For the dispersion, known dispersers can be used.

As a method of coating a support with coating compositions to form the present magnetic disk having a multilayer structure, the following methods are preferably adopted.

In a first method, a lower layer is formed on a support by the use of a coating machine usually applied in coating magnetic coating compositions, such as a gravure, roll, blade or extrusion coater and, while the lower layer is in an undried condition, an upper layer is coated thereon by the use of a pressurized support type extrusion coating machine as disclosed in JP-B-1-46186, JP-A-60-238179 and JP-A-2-265672.

In a second method, an upper layer and a lower layer are coated almost simultaneously by the use of a coating head having two slits for passage of coating compositions as disclosed in JP-A-63-88080, JP-A-2-17971 and JP-A-2-265672.

In a third method, an upper layer and a lower layer are coated almost simultaneously by the use of a backup roll-attached extrusion coater as disclosed in JP-A-2-174965.

In addition, it is desirable to apply a sheering stress to the coating composition in the interior of a coating head by the use of the method disclosed in JP-A-62-95174 or JP-A-1-236968 for the purpose of preventing electromagnetic characteristics of the magnetic disk to be formed from degrading due to agglomeration of magnetic particles.

Further, it is preferred that the coating compositions have their viscosity in the numerical range disclosed in JP-A-3-8471.

By adopting a successive multilayer coating method wherein after coating the lower layer and drying it, the magnetic layer is coated thereon, the layer structure of a magnetic disk according to the invention can be achieved without extinction of the present effects. However, it is preferable to adopt the aforementioned simultaneous multilayer coating method from the viewpoints of reduction in coating defects and improvements in dropout quality.

The present magnetic disk can sometimes have sufficiently isotropic orientation without using any orientation apparatus, but it is preferable to make the magnetic disk have isotropic orientation by the use of a random orientation apparatus, e.g., an apparatus equipped with cobalt magnetics aligned in a staggered format or an apparatus equipped with a solenoid for application of an alternating magnetic field. As to the isotropic orientation in-plane two-dimensionally random orientations are generally preferable, but three-dimensionally random orientations with a vertically magnetized component are also appropriate. On the other hand, circumferential orientation may be provided by spin-coating.

In the foregoing coating step, it is appropriate that the drying position on the coating layer be controlled by properly adjusting the temperature and volume of drying air and the coating speed. Specifically, the coating speed is preferably chosen from the range of 20 to 1,000 m/min, and the temperature of drying air is preferably 60° C. or above. In addition, the coating layer may undergo appropriate pre-drying treatment before it enters into the orientation step.

As a roll for calendering, a heat-resistant plastic roll, such as a roll made from epoxy resin, polyimide, polyamide or polyimideamide, or a metal roll can be used. In the case of providing the magnetic layer on both sides, it is desirable that the calendering be performed between two metal rolls. A calender roll temperature is preferably not lower than 50° C., more preferably 100° C. or above, and a linear pressure applied is preferably at least 1960 N/cm (200 kg/cm), more preferably at least 2940 N/cm (300 kg/cm).

After calendering treatment, the thus produced magnetic recording medium is stamped into disks, and each of these disks is encased in a cartridge provided with a liner on the inside. Further, the intended electromechanical components are attached to the cartridge, thereby producing a magnetic disk. In addition, after-treatment, such as burnish treatment with an abrasive tape to cut away protrusions, may be carried out, if desired.

[Physical Characteristics]

The magnetic layer of the magnetic disk according to the invention has a saturated magnetic flux density of 0.2 to 0.6 tesla (2,000 to 6,000 gauss) under normal conditions. With respective to the coercive force distribution therein, the narrower the better. The values of SFD and SFDr are preferably each 0.6 or below. Further, in an ordinary case, the magnetic layer has a squareness ratio of 0.45 to 0.55 when it is in a randomly oriented state, 0.6 to 0.67 when it is in a state of two-dimensionally random orientation, and at least 0.5 when it is in a vertically oriented state.

A coefficient of friction of the present magnetic disk with a head is preferably at most 0.5, more preferably at most 0.3, at temperatures between −10° C. to 40° C. and humidities between 0% to 95%. A specific resistance at the magnetic layer surface is preferably from $10^4$ to $10^{12}$ Ω/sq, and the suitable electrification potential is from −500 V to +500 V.

It is preferred that the magnetic layer have an elasticity modulus of 980 to 19,600 N/mm² (100 to 2,000 Kg/mm²) under a 0.5% elongation in all in-plane directions and a tensile strength of 98 to 686 N/mm² (10 to 70 Kg/mm²) at break. On the other hand, it is preferred that the magnetic disk has an elastically modulus of 980 to 14,700 N/mm² (100 to 1,500 Kg/mm²) in all in-plane directions, a residual elongation of at most 0.5% and a thermal shrinkage of at most 1%, more preferably at most 0.5%, still more preferably at most 0.1%, at all of temperatures up to 100° C.

A glass transition temperature of the magnetic layer (the maximum point of loss elasticity modulus in the kinetic viscoelasticity measurement made at 100 Hz) is preferably from 50° C. to 120° C., and that of the lower layer is preferably from 0° C. to 100° C.

The loss elasticity modulus is preferably from $1\times10^3$ to $1\times10^4$ N/cm² ($1\times10^8$ to $8\times10^9$ dyne/cm²), and the loss tangent is preferably at most 0.2. When the loss tangent is too great, an tackiness trouble tends to occur. It is preferred that these thermal characteristics and mechanical characteristics are almost uniform in all in-plane directions of the medium with tolerances of 10%. A content of residual solvent in the magnetic layer is preferably 100 mg/m² or below, more preferably 10 mg/m² or below.

It is favorable that the non-magnetic layer and the magnetic layer have both a porosity of 30 volume % or below, more preferably 20 volume % or below. The smaller porosity is more favorable for achieving high output, but the porosity may be increased to an extent necessary for a certain particular purpose. For instance, in the case of repetition use-oriented disk media, the greater porosity is more favorable for ensuring running durability.

In the present magnetic disk, the lower layer and the magnetic layer can be independently adjusted in those physical characteristics depending on the intended purposes. For instance, high elasticity modulus is conferred on the magnetic layer to improve the running durability, and at the same time the elasticity modulus of the lower layer is rendered lower than that of the magnetic layer to ensure a desirable touch of a head on the magnetic disk.

Now, the invention will be illustrated in more detail by reference to the following examples, but these examples should not be construed as limiting the scope of the invention in any way. All "parts" in the following examples are by weight unless otherwise noted.

EXAMPLES 1 TO 12 AND COMPARATIVE EXAMPLES 1 TO 15

(Preparation of Coating Compositions)

| Magnetic coating composition A (for magnetic layer A): | |
|---|---|
| Ferromagnetic metal powder | 100 parts |
| Composition: Fe 70%, Co 30%, | |
| Hc: 183 kA/m (2,300 Oe), | |
| Average major axis length: See Table 1, | |
| Crystallite size: 15 nm, | |
| σs: 150 A · m$^2$/Kg (150 emu/g) | |
| Sintering inhibitor: Al compound (Al/Fe atomic ratio 14%) | |
| Y compound (Y/Fe atomic ratio 7%) | |
| Vinyl chloride copolymer | 10 parts |
| (MR110, a product of Nippon Zeon Co., Ltd.) | |
| Polyurethane resin | 4 parts |
| (UR8200, a product of Toyobo Co., Ltd.) | |
| α-Alumina | 5 parts |
| (HIT55, a product of Sumitomo Chemical Co., Ltd.) | |
| Carbon black | 1 parts |
| (#50, a product of Asahi Carbon Co., Ltd.) | |
| Phenylphosphonic acid | 3 parts |
| n-Butyl stearate | 3 parts |
| Butoxyethyl stearate | 3 parts |
| Ethylene glycol dioleate | 3 parts |
| Stearic acid | 6 parts |
| Oleic acid | 1 parts |
| Methyl ethyl ketone | 140 parts |
| Cyclohexanone | 200 parts |

| Magnetic coating composition B (magnetic layer B): | |
|---|---|
| Hexagonal barium ferrite | 100 parts |
| Surface treatment: Al$_2$O$_3$ 5 weight %, SiO$_2$ 2 weight %, | |
| Hc: 239 kA/m (3,000 Oe), | |
| Tabular diameter: See Table 1, | |
| Tabular ratio: 3, | |
| σs: 56 A · m$^2$/Kg (56 emu/g) | |
| Vinyl chloride copolymer | 6 parts |
| (MR110, a product of Nippon Zeon Co., Ltd.) | |
| Polyurethane resin | 3 parts |
| (UR8200, a product of Toyobo Co., Ltd.) | |
| α-Alumina | 5 parts |
| (HIT55, a product of Sumitomo Chemical Co., Ltd.) | |
| Carbon black | 5 parts |
| (#50, a product of Asahi Carbon Co., Ltd.) | |
| n-Butyl stearate | 3 parts |
| Butoxyethyl stearate | 3 parts |
| Ethylene glycol dioleate | 6 parts |
| Stearic acid | 1 parts |
| Oleic acid | 1 parts |
| Methyl ethyl ketone | 80 parts |
| Cyclohexanone | 120 parts |

| Non-magnetic coating composition: | |
|---|---|
| TiO$_2$ as non-magnetic powder | 100 parts |
| Crystal form: rutile | |
| TiO$_2$ content: 90% or more | |
| Average primary grain size: 35 nm | |
| BET specific surface area: 40 m$^2$/g, | |
| pH: 7, | |
| DBP absorptive capacity: 27 to 38 g/100 g, | |
| Surface treatment agent: Al$_2$O$_3$, SiO$_2$ | |
| Carbon black (Ketjenblack EC) | 13 parts |
| Vinyl chloride copolymer | 17 parts |
| (MR110, a product of Nippon Zeon Co., Ltd) | |
| Polyurethane resin | 6 parts |
| (UR8200, a product of Toyobo Co., Ltd.) | |
| Phenylphosphonic acid | 3 parts |
| Ethylene glycol dioleate | 8 parts |
| n-Butyl stearate | 4 parts |
| Butoxyethyl stearate | 4 parts |
| Stearic acid | 1 parts |
| Oleic acid | 1 parts |
| Methyl ethyl ketone | 120 parts |
| Cyclohexanone | 180 parts |

The ingredients to constitute the aforementioned coating compositions each were kneaded with an open kneader, and then dispersed with a sand mill. To each of the dispersions thus prepared, a commercially available polyisocyanate was added in an amount of 13 parts to the coating composition for non-magnetic layer, 4 parts to the coating composition A for magnetic layer A, and 5 parts to the coating composition B or magnetic layer B. Further, 30 parts of cyclohexanone was added to each of the compositions. The resulting compositions were each passed through a filter having an average pore size of 1 μm, thereby preparing coating compositions for magnetic layers and lower layer (non-magnetic layer) respectively.

By the use of a simultaneous coating method, the lower layer coating composition and each of the magnetic layer coating compositions thus prepared were applied to a 62 μm-thick polyethylene terephthalate support having a center-plane average surface roughness of 3 nm so as to form a lower layer having a dry thickness of 1.5 μm and a magnetic layer having a dry thickness set forth in Table 1. While both of the layers were in a wet condition, they were treated so as to have random orientation by passing them through an apparatus generating an alternative magnetic field having an intensity of 0.025 tesla (250 gauss) and a frequency of 50 Hz. After drying, the support coated with those two layers was subjected to calender treatment using a 7-stage calender under conditions that the temperature was 90° C. and the linear pressure was 2940 N/m (300 Kg/cm), and then stamped into disks measuring 3.7 inches in diameter, followed by surface polishing treatment. Further, each of these disks was encased in a 3.7-inch cartridge in which a linear was previously installed (Zip-disk cartridge, produced by Iomega Corp. In U.S.) and further to the cartridge were attached the intended electromechanical components. Thus, 3.7 inch floppy disks were produced.

(Measurements and Evaluations)

The following properties of each of the samples prepared in the aforementioned manner were measured and evaluated. The results thereof are shown in Table 1 (Examples) and Table 2 (Comparative Examples). The symbol representing the numeric value of error rate, e.g., 5E-09, means 5×10$^{-9}$.

(1) S/N ratio measurement:

The S/N ratio of each sample was measured by the use of a disk evaluation apparatus Model RWA1001 produced by Guzik Technical Enterprises in U.S. and a Spinstand LS-90 produced by Kyodo Denshi System Co., Ltd. Therein, the reproduced output (TAA) measurements and the noise level measurements after DC erase were made making changes in line recording density at a radial position of 24.6 mm by means of metal-in-gap heads differing in width and having a gap spacing of 0.2 μm, thereby determining S/N values.

(2) Method of determining error rates:

In determining error rates of disk samples, a disk evaluation apparatus Model RWA1001 produced by Guzik Technical Enterprises in U.S. and a Spinstand LS-90 produced by Kyodo Denshi System Co., Ltd. were used, too. Therein, random pattern signals changed in the maximum line recording density as in Examples were recorded at a radial position of 24.6 mm on respective disk samples in accordance with a (2, 7) RLL modulation scheme by means of metal-in-gap heads differing in width and having a gap spacing of 0.2 μm.

(3) Methods of measuring magnetic layer thickness and determining standard deviation thereof:

Sections having a thickness of about 0.1 μm were cut from each disk sample with a diamond cutter. Each section was observed under a transmission electron microscope of a magnification ranging from 10,000 to 100,000 times, preferably a magnification of 20,000 or 50,000 times, and a microscope photograph thereof was taken. From this photograph, a photo print having an A-4 or A-5 size was made. On the photo print, the magnetic layer surface and the interface between the magnetic layer and the lower layer, which was visually judged from a shape different between the ferromagnetic powder and the non-magnetic powder, were each bordered with a black line. The spacing between these black lines was measured with an image processing device IBAS2 made by Zeiss A. G. When the sample photograph had a length of 21 cm, the measuring process was repeated 85 to 300 times. The mean value of the data obtained therein was represented by d, and the standard deviation of those data was symbolized as σ. The value d was evaluated by the following numerical formula (1), and the value σ was evaluated by the following numerical formula (2). Therein, di represents each measured value, and n is from 85 to 300.

$$d = \frac{1}{n}\sum_{i=1}^{n} di \quad (1)$$

$$\sigma = \left[\frac{1}{n-1}\sum_{i=1}^{n}(di-d)^2\right]^{1/2} \quad (2)$$

TABLE 1

| Example | Bit length (B) [μm] | Track width (T) [μm] | Magnetic coating composition | Major axis length or tabular diameter (L) [μm] | B/L | T/L | Magnetic layer thickness (d) [μm] | Standard deviation of thickness (σ) [μm] | σ/d | S/N ratio [dB] | Error rate |
|---|---|---|---|---|---|---|---|---|---|---|---|
| 1 | 0.49 | 4.7 | A | 0.07 | 7.0 | 67.1 | 0.12 | 0.05 | 0.42 | 29 | 5E-09 |
| 2 | 0.49 | 4.7 | A | 0.05 | 9.8 | 94.0 | 0.12 | 0.05 | 0.42 | 30 | 1E-09 |
| 3 | 0.49 | 2 | A | 0.035 | 14.0 | 57.1 | 0.12 | 0.05 | 0.42 | 30 | 1E-09 |
| 4 | 0.4 | 4 | A | 0.07 | 5.7 | 57.1 | 0.12 | 0.05 | 0.42 | 29 | 5E-09 |
| 5 | 0.4 | 4 | A | 0.05 | 8.0 | 80.0 | 0.12 | 0.05 | 0.42 | 30 | 1E-09 |
| 6 | 0.2 | 4 | A | 0.05 | 4.0 | 80.0 | 0.12 | 0.05 | 0.42 | 29 | 5E-09 |
| 7 | 0.4 | 4 | A | 0.07 | 5.7 | 57.1 | 0.1 | 0.05 | 0.50 | 28 | 7E-09 |
| 8 | 0.4 | 4 | A | 0.07 | 5.7 | 57.1 | 0.08 | 0.04 | 0.50 | 28 | 7E-09 |
| 9 | 0.4 | 4 | A | 0.07 | 5.7 | 57.1 | 0.08 | 0.03 | 0.38 | 30 | 1E-09 |
| 10 | 0.49 | 2 | B | 0.035 | 14.0 | 57.1 | 0.1 | 0.03 | 0.30 | 30 | 1E-09 |
| 11 | 0.2 | 0.2 | B | 0.035 | 5.7 | 57.1 | 0.1 | 0.03 | 0.30 | 29 | 5E-09 |
| 12 | 0.2 | 0.2 | B | 0.02 | 10.0 | 100 | 0.1 | 0.03 | 0.30 | 30 | 1E-09 |

TABLE 2

| Comparative Example | Bit length (B) [μm] | Track width (T) [μm] | Magnetic coating composition | Major axis length or tabular diameter (L) [μm] | B/L | T/L | Magnetic layer thickness (d) [μm] | Standard deviation of thickness (σ) [μm] | σ/d | S/N ratio [dB] | Error rate |
|---|---|---|---|---|---|---|---|---|---|---|---|
| 1 | 0.49 | 4.7 | A | 0.1 | 4.9 | 47.0 | 0.12 | 0.05 | 0.42 | 23 | 5E-06 |
| 2 | 0.49 | 4.7 | A | 0.035 | 14.0 | 134 | 0.12 | 0.05 | 0.42 | 23 | 3E-07 |
| 3 | 0.49 | 2 | A | 0.1 | 4.9 | 20.0 | 0.12 | 0.05 | 0.42 | 23 | 4E-05 |
| 4 | 0.49 | 2 | A | 0.07 | 7.0 | 28.6 | 0.12 | 0.05 | 0.42 | 23 | 4E-05 |
| 5 | 0.49 | 2 | A | 0.05 | 9.8 | 40.0 | 0.12 | 0.05 | 0.42 | 23 | 1E-05 |
| 6 | 0.4 | 4 | A | 0.035 | 11.4 | 114 | 0.12 | 0.05 | 0.42 | 23 | 3E-07 |
| 7 | 0.2 | 4 | A | 0.1 | 2.0 | 40.0 | 0.12 | 0.05 | 0.42 | 18 | 1E-05 |
| 8 | 0.2 | 4 | A | 0.07 | 2.9 | 57.1 | 0.12 | 0.05 | 0.42 | 15 | 3E-07 |
| 9 | 0.2 | 4 | A | 0.035 | 5.7 | 114 | 0.12 | 0.05 | 0.42 | 23 | 3E-07 |
| 10 | 0.4 | 4 | A | 0.07 | 5.7 | 57.1 | 0.15 | 0.05 | 0.33 | 30 | 3E-07 |
| 11 | 0.4 | 4 | A | 0.07 | 5.7 | 57.1 | 0.08 | 0.05 | 0.63 | 23 | 3E-07 |
| 12 | 0.49 | 2 | B | 0.05 | 9.8 | 40.0 | 0.1 | 0.03 | 0.30 | 23 | 1E-05 |
| 13 | 0.49 | 2 | B | 0.02 | 24.5 | 100 | 0.1 | 0.03 | 0.30 | 24 | 3E-07 |
| 14 | 0.4 | 4 | A | 0.1 | 4.0 | 40.0 | 0.12 | 0.05 | 0.42 | 23 | 3E-07 |
| 15 | 0.2 | 2 | B | 0.05 | 4.0 | 40.0 | 0.1 | 0.03 | 0.30 | 20 | 5E-06 |

The data shown in Table 1 and Table 2 reveal the following.

Specifically, the magnetic disks produced in Examples 1 to 12 are magnetic recording media enabling high-density recording at a low-noise level and a reduced error rate.

On the other hand, the magnetic disks produced in Comparative Examples 1 to 15 have drawbacks described below:

When the track width/major axis length (or tabular diameter) ratio is lower than 50 (Comparative Example 1, 3, 4, 5, 7, 12, 14 and 15), magnetization irregularity in the track edge part becomes great to cause an increase in noise level and deterioration in error rate.

When the track width/major axis length (or tabular diameter) ratio is greater than 100 (Comparative Examples 2, 6 and 9), the magnetic particle size is relatively small to the track width, so (1) magnetic particles agglomerate and (2) in-plane orientation is degraded (SQ in the vertical direction is increased) to result in lowering of S/N ratio and deterioration in error rate.

When the bit length/major axis length (or tabular diameter) is smaller than 3 (Comparative Examples 7 and 8), the magnetization transition length between bits is great, so the S/N ratio is lowered, an increase in PW50 is caused and the error rate is degraded.

When the bit length/major axis length (or tabular diameter) is greater than 20 (Comparative Example 13), the magnetic particle size is relatively small to the bit length, so (1) magnetic particles agglomerate and (2) in-plane orientation is degraded (SQ in the vertical direction is increased) to result in lowering of S/N ratio and deterioration in error rate.

When the magnetic layer thickness is 0.15 $\mu$m (Comparative Example 10), satisfactory PW50 cannot be attained under the high-density recording condition adopted, so deterioration in error rate is caused.

When the σ/ratio is greater than 0.5 (Comparative Example 11), an increase in noise and deterioration in error rate are caused.

The magnetic disks in accordance with the invention have remarkably improved electromagnetic characteristics, especially high-density recording characteristics, and besides, they can ensure markedly improved error rate in the high-density recording area and low noise.

The entire disclosure of each and every foreign patent application from which the benefit of foreign priority has been claimed in the present application is incorporated herein by reference, as if fully set forth herein.

What is claimed is:

1. A magnetic disk comprising:

a support;

a non-magnetic layer which is substantially non-magnetic; and a magnetic layer having a thickness of less than 0.15 $\mu$m and containing as ferromagnetic powder, at least one of fine particles of ferromagnetic metal and ferromagnetic hexagonal ferrite dispersed in a binder, in this order, wherein (I) the disk has a track width of less than 5 $\mu$m and is able to record signals having a bit length of less than 0.5 $\mu$m, (II)-(i) when the ferromagnetic powder is fine particles of ferromagnetic metal, the fine particles of ferromagnetic metal have an average major axis length satisfying conditions that a ratio of the track width to the average major axis length is from 50 to 100 and a ratio of the bit length to the average major axis length is from 3 to 20, (II)-(ii) when the ferromagnetic powder is fine particles of ferromagnetic hexagonal ferrite, the fine particles of ferromagnetic hexagonal ferrite have an average tabular diameter satisfying conditions that a ratio of the track width to the average tabular diameter is from 50 to 100 and a ratio of the bit length to the average tabular diameter is from 3 to 20, and (III) the thickness of the magnetic layer has a variation coefficient of 0.5 or below, expressed in terms of a ratio of the standard deviation to the average thickness of the magnetic layer.

2. The magnetic disk as claimed in claim 1, wherein the ferromagnetic powder is fine particles of ferromagnetic hexagonal ferrite having an average tabular diameter of 35 nm or below.

3. The magnetic disk as claimed in claim 1, wherein the ferromagnetic powder is fine particles of ferromagnetic metal having an average major axis length of 150 nm or below.

4. The magnetic disk as claimed in claim 1, wherein the non-magnetic layer and the magnetic layer are those formed by a wet-on-wet coating method.

5. The magnetic disk as claimed in claim 1, which has a track width of 1 to 5 $\mu$m.

6. The magnetic disk as claimed in claim 1, which has a bit length of 0.1 to 0.4 $\mu$m.

7. The magnetic disk as claimed in claim 1, wherein the fine particles of ferromagnetic metal have a ratio of the track width to the average major axis length is from 60 to 80.

8. The magnetic disk as claimed in claim 1, wherein the fine particles of ferromagnetic metal have a ratio of the bit length to the average major axis length is from 5 to 15.

9. The magnetic disk as claimed in claim 1, wherein the fine particles of ferromagnetic hexagonal ferrite have a ratio of the track width to the average tabular diameter is from 60 to 80.

10. The magnetic disk as claimed in claim 1, wherein the fine particles of ferromagnetic hexagonal ferrite have a ratio of the bit length to the average tabular diameter is from 5 to 15.

11. The magnetic disk as claimed in claim 1, wherein the magnetic layer has a thickness of from 0.03 to 0.8 $\mu$m.

12. The magnetic disk as claimed in claim 1, wherein the thickness of the magnetic layer has a variation coefficient of 0.3 or below.

13. The magnetic disk as claimed in claim 1, wherein the magnetic layer has a coercive force (Hc) of at least 143 kA/m (1,800 oersted).

* * * * *